May 19, 1970      T. R. JORRIS      3,512,892
METHOD AND APPARATUS FOR ALIGNING GUNS
Filed March 3, 1969      2 Sheets-Sheet 1
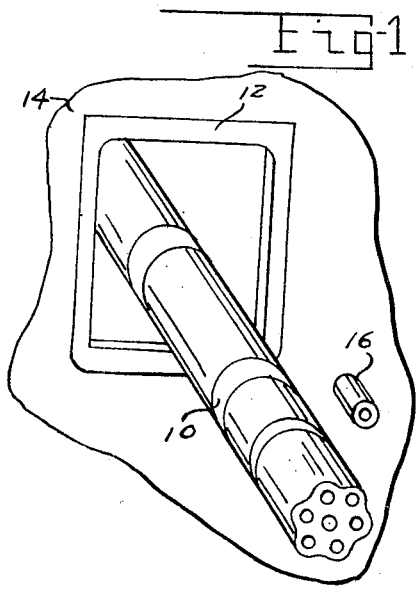
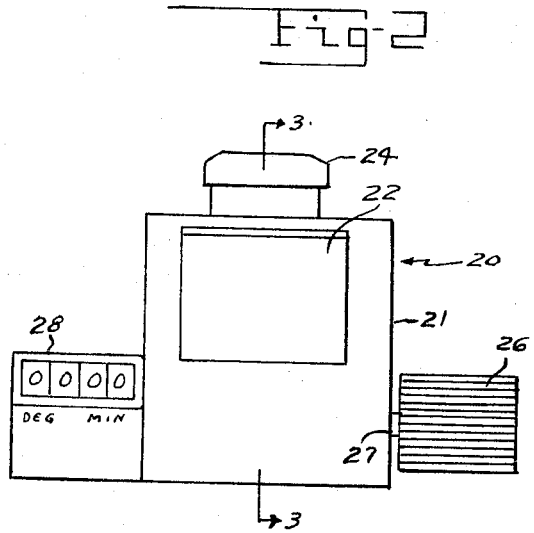
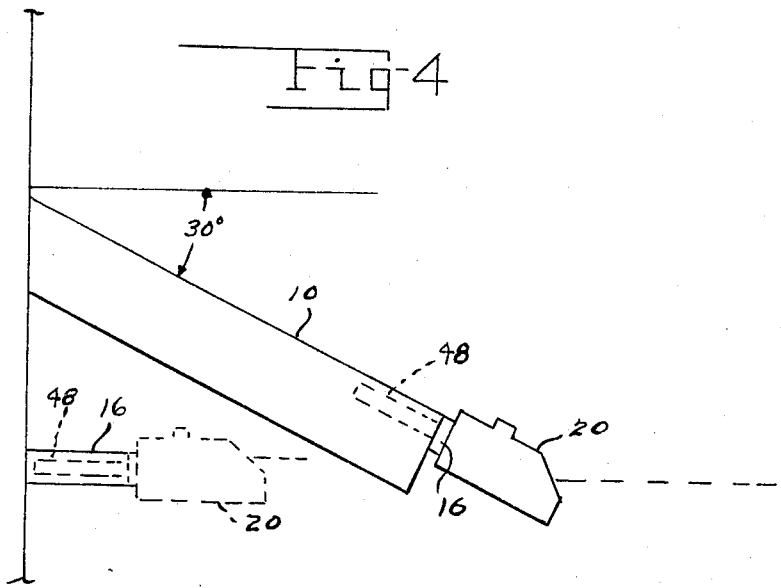
INVENTOR.
TERRY R. JORRIS
BY *Harry A. Herbert, Jr.*
ATTORNEY
*Richard J. Killoe*
AGENT

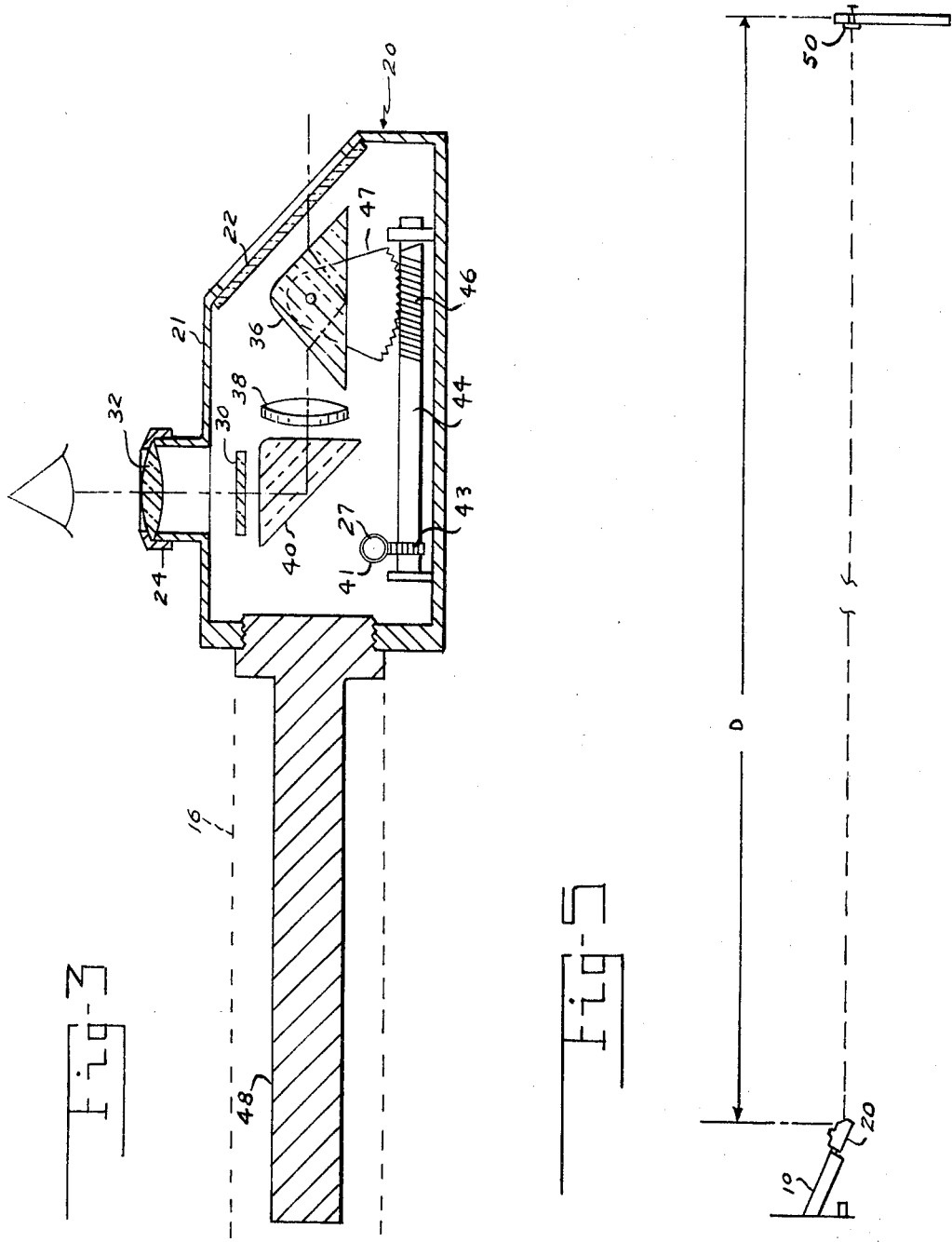

United States Patent Office 3,512,892
Patented May 19, 1970

3,512,892
METHOD AND APPARATUS FOR ALIGNING GUNS
Terry R. Jorris, Spring Valley, Minn., assignor to the United States of America as represented by the Secretary of the Air Force
Filed Mar. 3, 1969, Ser. No. 803,898
Int. Cl. G01b 11/26
U.S. Cl. 356—153        5 Claims

ABSTRACT OF THE DISCLOSURE

An alignment instrument having a shaft adapted to be positioned in a gun barrel has an adjustable prism for changing the line of sight of the instrument. The drive means for changing the line of sight is also used to position an indicator. The instrument, with its indicator set at zero, is positioned in a cylindrical element, located near the gun to be aligned. The cylindrical element has its longitudinal axis fixed with respect to the transverse axis of the aircraft. A target is aligned with the cross hair of the instrument. The desired depression angle is then set into the instrument by changing the adjustable prism after which the instrument is placed in the gun barrel. The gun barrel is then positioned to again align the target with the cross hair and the gun is fixed in this position.

BACKGROUND OF THE INVENTION

Alignment of guns with large depression angles, such as Gatling guns, on side-facing aircraft with conventional target board alignment techniques presents several problems. This system of alignment of the guns requires jacking of the aircraft of target board for leveling. Also the large depression angles used with such guns require that the target boards be located close to the aircraft which increases the errors due to parallax.

SUMMARY OF THE INVENTION

According to this invention, the alignment procedure for guns on side-firing aircraft is simplified by providing a cylindrical element, having a bore of the same size as the barrel of the gun to be aligned, on the aircraft adjacent the gun. The cylindrical element is mounted on the aircraft with its longitudinal axis fixed with respect to the aircraft frame, for example, parallel to the transverse horizontal axis of the aircraft. A boresight instrument having a prism therein whereby the line of sight angle from the alignment instrument may be varied has a readout indicator which is set at zero angle when placed in the cylindrical element. A distant target is positioned in alignment with the cross hair. The instrument is then removed from the cylindrical element and the desired depression angle is set on the indicator. The instrument is then placed in the bore of the gun and the gun is positioned to again align the cross hair with the target. The gun is then fixed in this position.

BRIEF DESCRIPTION OF THE DRAWING

FIG. 1 is a fragmentary view of an aircraft with a side-firing gun;
FIG. 2 is an end view of the alignment instrument of the invention;
FIG. 3 is a partially schematic sectional view of the device of FIG. 2 along the line 3—3;
FIG. 4 is a schematic illustration showing the use of the alignment instrument of FIG. 2 as used to align the gun of FIG. 1; and
FIG. 5 is a schematic illustration showing the alignment of the instrument of FIG. 2 with a selected target.

DESCRIPTION OF THE PREFERRED EMBODIMENT

With reference to FIG. 1 of the drawing, a side-firing gun 10 is shown projecting from a gun port 12 in the side 14 of an aircraft, not shown in detail. A reference cylindrical element 16 is secured to the aircraft and has its longitudinal axis fixed with respect to the aircraft, for example, aligned in parallel relation with the transverse axis of the aircraft.

An alignment instrument 20 shown in FIGS. 2 and 3 has a housing 21 with a window 22, an eyepiece 24, a control knob 26 connected to a shaft 27, which is connected to an indicator 28. A transparent plate member 30 with cross hair, not shown, provides a reticle which is positioned at the focal plane of lens 32. Light rays entering window 22 pass through an adjustable reflective prism 36, through an objective lens 38 and are reflected toward the eyepiece 24 by means of a stationary reflective prism 40.

The shaft 27 has a worm gear 41 for driving a gear wheel 43 secured to a shaft 44. The shaft 44 has a worm gear 46 for driving a sector gear 47 which is secured to prism 36 to rotate the prism 36 to thereby change the line of sight of the instrument. A shaft member 48 is secured to the housing 20. The member 48 has a diameter which will provide a close fit in the cylindrical element 16 and the barrel of gun 10. Members 48 of different sizes may be provided for use with guns having different barrel sizes. Also a single shaft size may be used with different size cylindrical adaptors to adapt the instrument to different barrel sizes, if desired.

In the operation of the device, the shaft 48 of instrument 20 is positioned in the cylindrical element 16 as shown in FIG. 4 with the indicator 28 reading zero. A target 50, shown in FIG. 5, is then positioned a distance D, preferably greater than 1000 yards from the aircraft, and the target is aligned with the center of the cross hair. The instrument is then removed from element 16 and the desired depression angle is set on indicator 28. The instrument is then positioned in a barrel of gun 10 and the gun is adjusted until the target is again aligned with the cross hair. The gun is then fixed in this position.

A special target need not be provided if a distant target such as a tree or pole can be found. Also, while the instrument is located in element 16, the indicator 28 may be moved from zero to obtain the initial alignment with a target. To then set the desired depression angle, the indicator would be set to the total of the initial reading plus the desired depression angle.

The position of the element 16 with respect to the gun is not very critical when distant targets are used to align the gun since about a 3 mil error is permissible. Thus, when targets in excess of 1000 yards distance from the aircraft are used, the element 16 may be displaced as much as 3 yards from a line through the end of the gun barrel to the target. If more distant targets are used, the displacement could be greater; however, in most cases it will be positioned much closer than 3 yards.

While the alignment instrument has been described as used to align side-firing guns, it could be used to align other guns such as rear-firing guns. The orientation of the element 16 with respect to the frame of the aircraft would be determined by the particular use, for example, when aligning rear-firing guns the reference cylindrical element 16 could be located with a predetermined fixed angular relation with respect to the longitudinal axis of the aircraft frame.

Also, various adaptors such as offsets to mount the instrument 16 in parallel offset relation to shaft 48 may be provided when it is necessary to sight around objects on the aircraft. Furthermore, the instrument could be rotated to adapt the device for providing angular offsets in azimuth, for example, if it were desired to have the side-firing guns fire slightly rearward. Also, the prism 40 and eyepiece 24 could be made rotatable with respect to the rest of the instrument so that the instrument may be sighted from the most convenient position.

Even though the device has been described as used for aligning guns, it could also be used to align other apparatus such as radar apparatus.

I claim:

1. An instrument for aligning guns, which are mounted on aircraft with large depression angles, comprising: a housing; a viewing eyepiece, including a lens, mounted on said housing; target alignment means positioned at the focal plane of said lens; an opening in said housing; said opening being displaced from said viewing eyepiece; optical means positioned in alignment with said opening, for directing light entering said opening through said eyepiece; means within said housing positioned in the path of said light between said opening and said eyepiece for changing the line of sight of the instrument from said alignment means through said opening; means, positioned outside of said housing and attached thereto and including means coupled to the line of sight changing means for indicating the angular setting of the line of sight changing means; and a shaft member, adapted to fit into the barrel of said gun, secured to said housing.

2. The device as recited in claim 1 wherein said line of sight changing means is a reflective prism having gear drive means connected thereto for changing the orientation of said prism.

3. The device as recited in claim 2 wherein said shaft member is threadably secured to said housing whereby shafts of different sizes may be secured to the housing.

4. The device as recited in claim 3 wherein said target alignment means is a reticle with cross hair.

5. The method of aligning a gun which is to be mounted on an aircraft with a large depression angle; comprising; positioning an alignment instrument, having a reticle with cross hair and means for adjusting the line of sight of the instrument, in a reference cylindrical element with the same bore size as the gun on the aircraft and with its longitudinal axis located with a predetermined fixed relation with respect to the frame of the aircraft; aligning a target, spaced a predetermined distance from the aircraft, in alignment with the cross hair; removing the instrument from the cylindrical element; changing said adjusting means to set the line of sight of the instrument to the desired depression angle; positioning the instrument in the muzzle end of a barrel of said gun; adjusting the position of the gun until the target is again aligned with the cross hair; and fixing the gun in the aligned position.

References Cited

UNITED STATES PATENTS

| 1,137,192 | 4/1915 | Ferber | 350—11 |
| 2,253,577 | 9/1950 | Laverdure | 356—140 |

RONALD L. WIBERT, Primary Examiner

W. L. SIKES, Assistant Examiner

U.S. Cl. X.R.

350—48, 286